April 17, 1951  C. L. THOMAS  2,549,646
FLUID DRIVE PUMP AND TRANSMISSION UNIT
Filed March 23, 1946  5 Sheets-Sheet 1

INVENTOR
Claude L. Thomas
BY
ATTORNEYS

April 17, 1951 C. L. THOMAS 2,549,646
FLUID DRIVE PUMP AND TRANSMISSION UNIT
Filed March 23, 1946 5 Sheets-Sheet 2

INVENTOR
Claude L. Thomas
BY
ATTORNEYS

April 17, 1951  C. L. THOMAS  2,549,646
FLUID DRIVE PUMP AND TRANSMISSION UNIT
Filed March 23, 1946  5 Sheets-Sheet 3

INVENTOR
Claude L. Thomas
ATTORNEYS

April 17, 1951     C. L. THOMAS     2,549,646
FLUID DRIVE PUMP AND TRANSMISSION UNIT
Filed March 23, 1946     5 Sheets-Sheet 4

INVENTOR
Claude L. Thomas
BY
ATTORNEYS

April 17, 1951        C. L. THOMAS        2,549,646
FLUID DRIVE PUMP AND TRANSMISSION UNIT Filed March 23, 1946        5 Sheets-Sheet 5

INVENTOR
Claude L. Thomas
BY
ATTORNEYS

Patented Apr. 17, 1951

2,549,646

UNITED STATES PATENT OFFICE 2,549,646

FLUID DRIVE PUMP AND TRANSMISSION UNIT

Claude L. Thomas, Yuba City, Calif.

Application March 23, 1946, Serial No. 656,636

2 Claims. (Cl. 60—53)

This invention relates to fluid transmissions; an important object being to provide a drive of this character, particularly suited to automotive use, which includes a fluid pump as an integral part of the mechanism, so that a very compact and complete unit is formed which may be readily mounted in connection with the rear end of an engine crankshaft.

Another object of the invention is to provide a drive mechanism of this general type having automatically functioning means to decrease the power input from the pump as the speed of the driven shaft is increased, while enabling the load on the pump to be decreased.

Another object of the invention is to provide a novel form of fluid pump which is very efficient, and may be used as such independently of any particular mechanism driven thereby.

These objects are accomplished by means of such structure and relative arrangement of parts as will fully appear by a perusal of the following specification and claims.

In the drawings similar characters of reference indicate corresponding parts in the several views.

Figure 1:
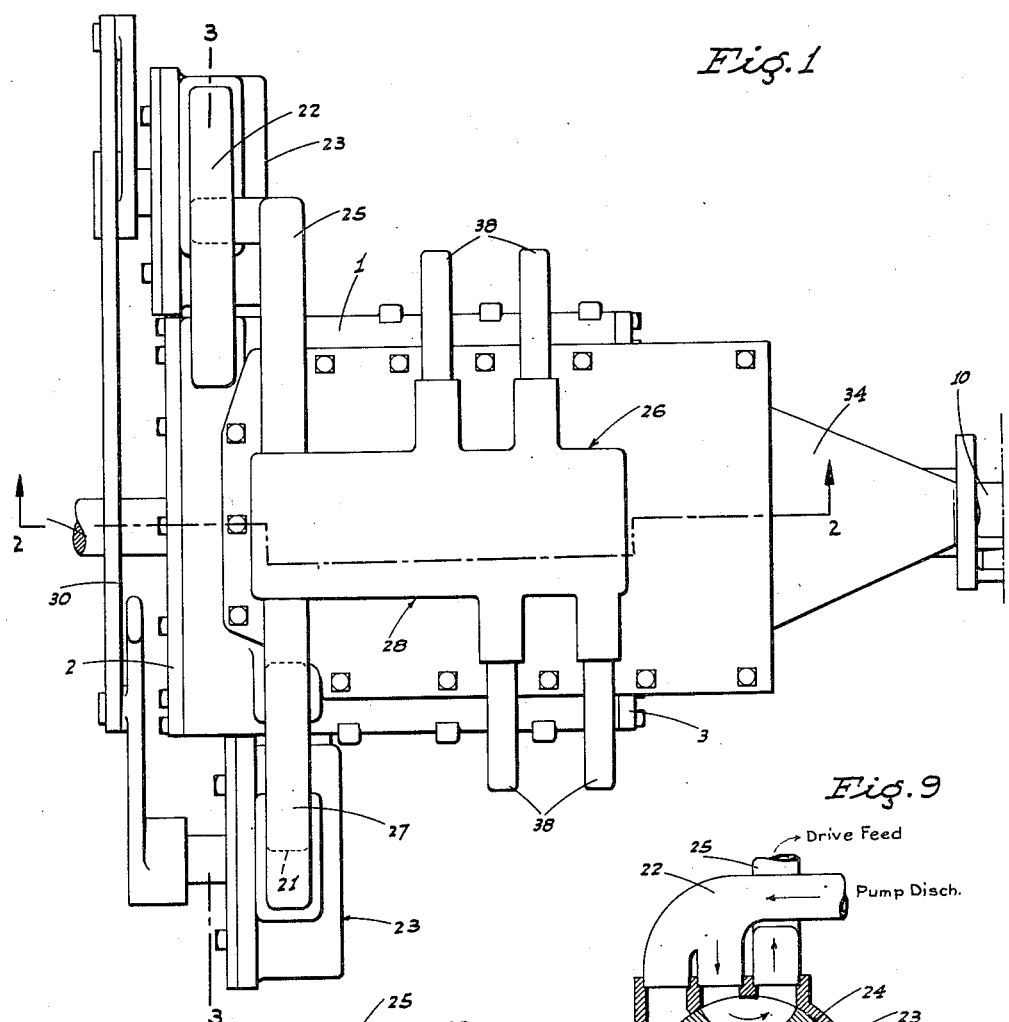
Figure 1 is a top plan view of my improved drive unit.

Referring now more particularly to the characters of reference on the drawings, the unit comprises a cylindrical casing 1 having end heads or plates 2 and 3. Inside the casing between the head 2 and a transverse partition 4 is a pump chamber 5. Other chambers 6 (preferably three in number) are formed in the casing between the partition 4 and the head 3 by a pair of fixed partitions 7 spaced equally apart. A drive shaft 8 projects through the head 2 and terminates in the hub 9 of the partition 4, while the driven shaft 10 projects from the hub 9 through the hubs 11 of the partitions 7 and the head 3 to a connection with the axle or other mechanism to be driven therefrom. From this arrangement it will be seen that the shafts 8 and 10, while rotatable independently of each other, are axially alined.

Figure 6:
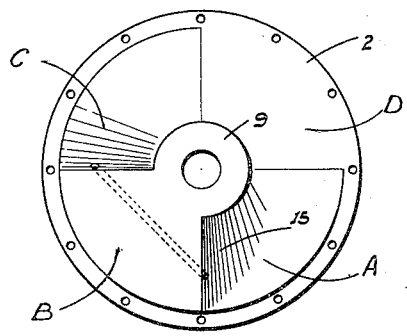
Figure 6 is an end elevation of one of the cams for actuating the pump vanes, the rotor removed.
Figure 7:
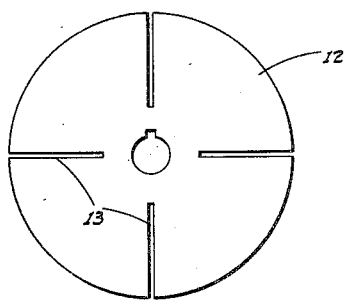
Figure 7 is an end elevation of the rotor plate with the vanes removed.
Figure 10:
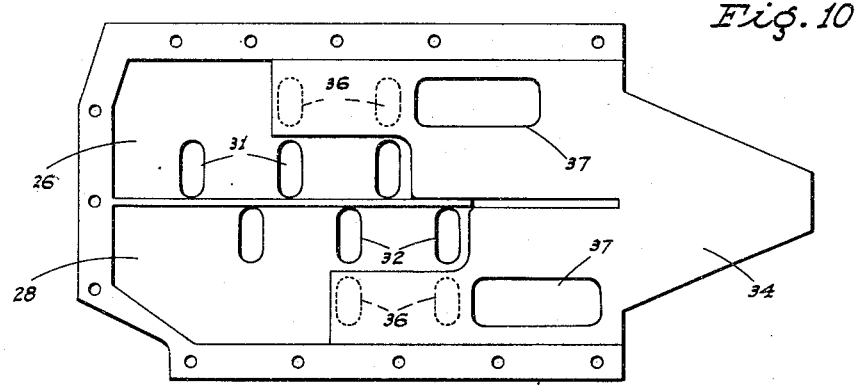
Figures 10–12 are plans of the slide valve housing with the cover removed and the automatic slide valve therein in different positions.

Turnable in the chamber 5 centrally between the head 2 and the partition 4 is a rotor plate 12 fixed on the shaft 8 and having a plurality of radial slots 13 extending from the periphery to the level of the hub 9. Rectangular plate-like vanes 14 are slidable in the plate slots and extend for their full depth and for the full width of the chamber 5. The head 2 and the partition 4 are formed on adjacent faces with cams 15 arranged in opposed relation to each other, and in such a manner that with the rotation of the drive shaft 8 and the rotor plate 12, the vanes will be alternately slid axially of the shaft from a position flush with the rotor plate on one side thereof to a similar position on the other side. In other words, the cams at circumferentially opposed points practically contact the rotor plate. The cams, including head 2, are each preferably arranged with a 90° rise A, a 90° dwell B, a 90° fall C, and a 90° dwell D, as shown in Fig. 6. By reason of the rotor plate 12 which has a running fit in the casing, the chamber 5 is divided into a pair of compartments separated axially of the casing.

Figure 5:
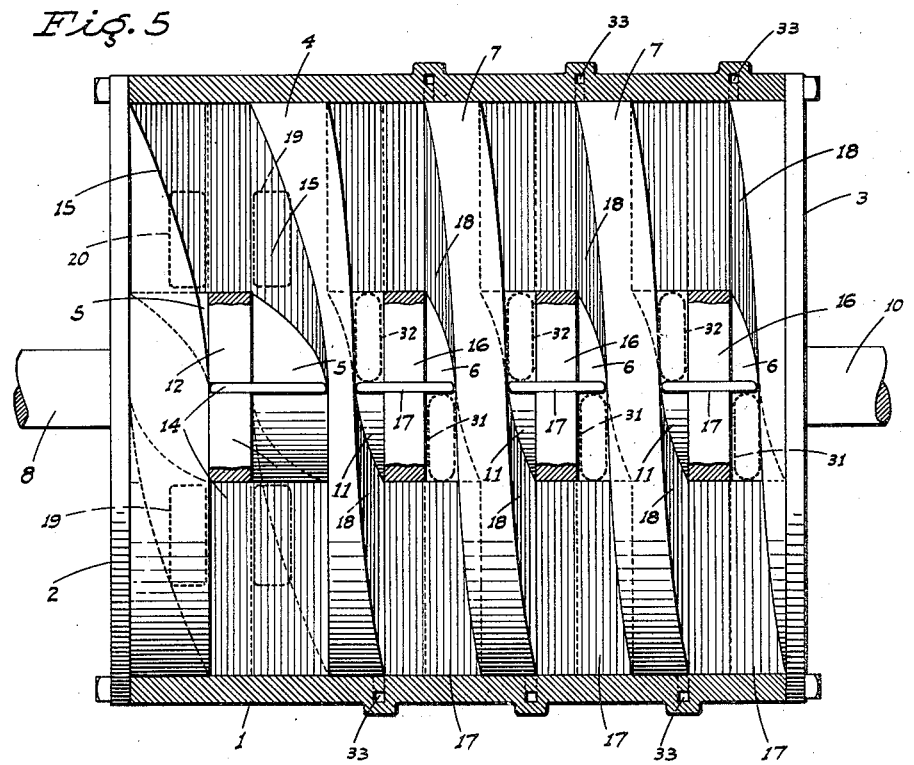
Figure 5 is a plan view of the pump and rotor unit, partly in section.

Similarly slotted, driven rotor plates 16 are fixed on the shaft 10 within the chambers 6 centrally of the axial extent, and have a running fit in the casing. These plates support vanes 17, also arranged to slide axially of the casing by reason of cams 18 formed on the adjacent faces of the partitions 4 and 7, and the end head 3. These cams also are arranged to shift the vanes from a flush position on one side of the plates 16 to a similar position on the opposite side. The cams 18 are preferably arranged to provide a 180° rise and a 180° fall. This formation of the cams is shown particularly in Fig. 5.

Figure 3:
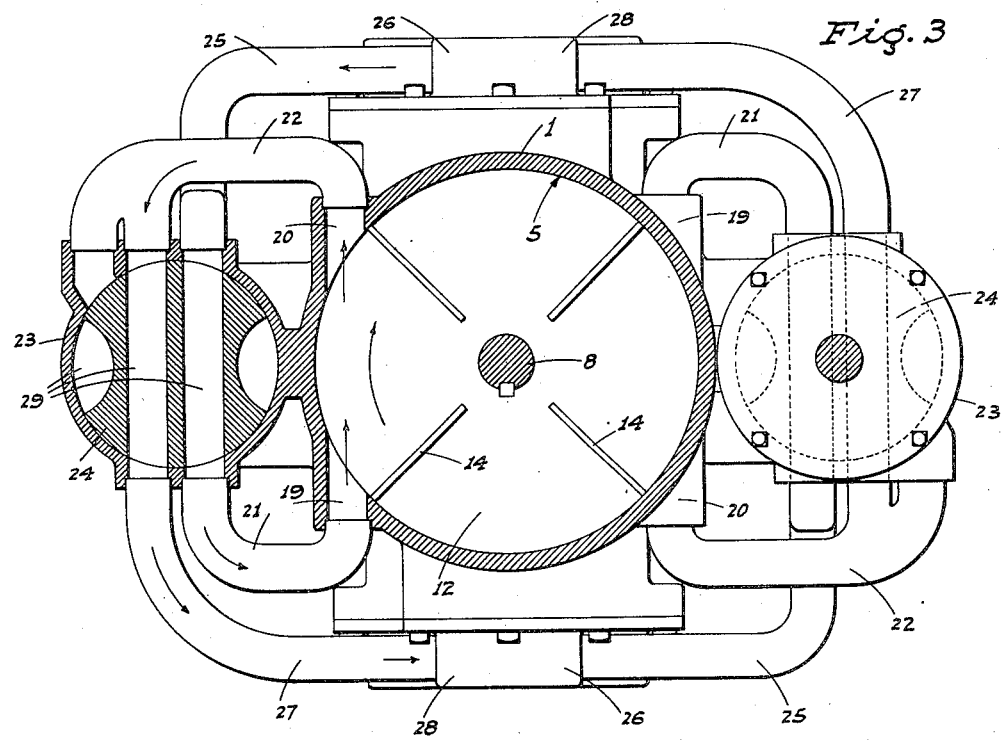
Figure 3 is a transverse section on the line 3—3 of Fig. 1.
Figure 4:
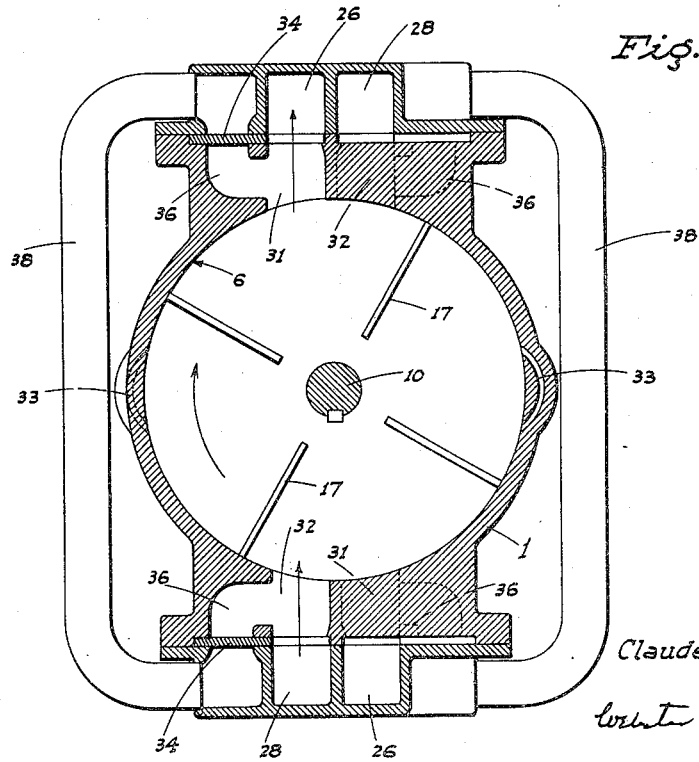
Figure 4 is a similar view on the line 4—4 of Fig. 2.

The fluid with which the system is filled is reversibly circulated from the compartments of the pump chamber 5 to the various chambers 6 of the driven rotors without reversing the direction of drive of the shaft 8 and the pump, by the following arrangement, which is shown particularly in Figs. 3 and 4.

The chamber 5 on opposite sides of the rotor plate 12 is provided with fluid intake and discharge ports 19 and 20, respectively, which are disposed in opposed relation to each other and in predetermined relation to the corresponding fixed cams 15 so that with rotation of the shaft 8 and plate 12, and the accompanying sliding movement of the vanes 14, fluid will be drawn into the ports 19 and discharged through ports 20 in alternating relation on opposite sides of said plate so as to provide a substantially even flow of the fluid.

Conduits 21 and 22 lead from the ports 19 and 20, respectively, to the casings 23 of rotary valves having rotors 24 therein. Conduits 25 lead from the casings 23 opposite the conduits 21 to manifolds 26 extending lengthwise of the casing 1 along the top and bottom thereof. Other conduits 27 lead from the casing 23 opposite the conduits 22 to other manifolds 28 paralleling the manifolds 26. Adjacent manifolds may, if desired, be formed as an integral unit, as shown.

Figure 9:
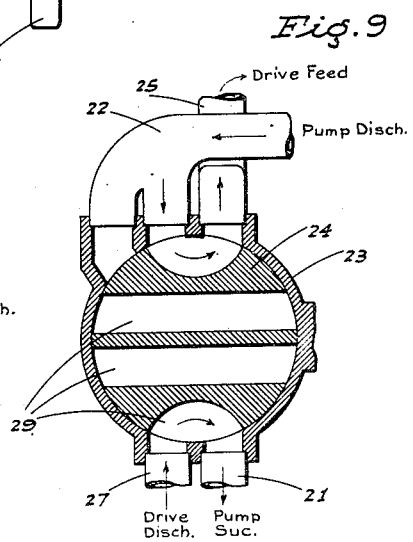
Figure 9 is a similar view of the valve in a reversing position.
Figure 8:
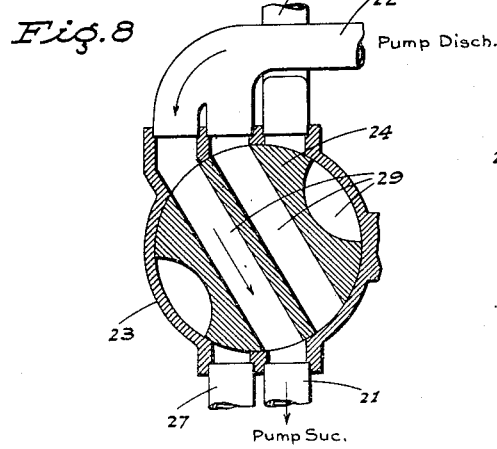
Figure 8 is a sectional elevation of one of the manual control valves in a neutral position.
Figure 2:
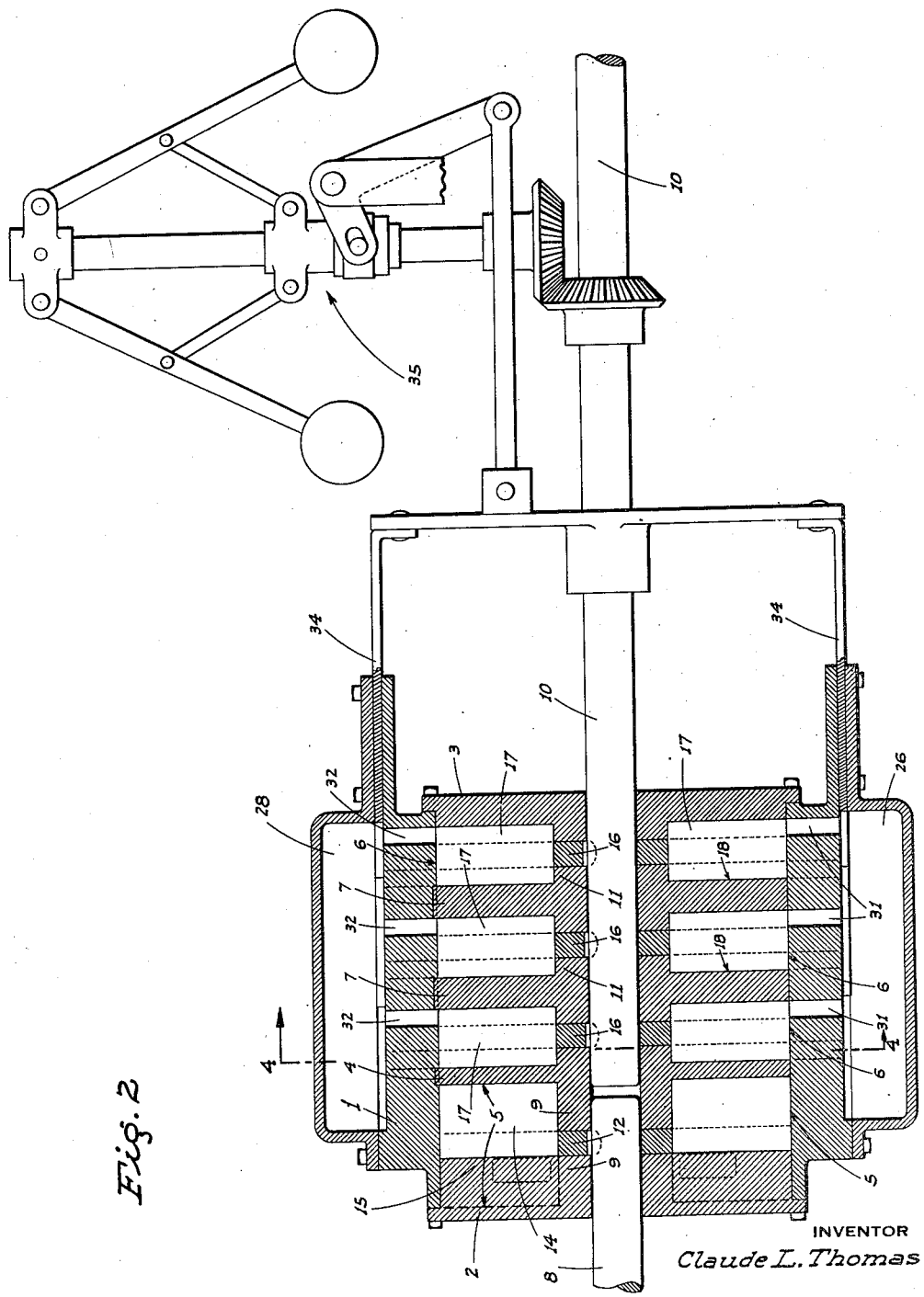
Figure 2 is a sectional elevation of the same substantially on the line 2—2 of Fig. 1.

The valve rotors 24 are ported, as at 29, to allow a flow of the fluid from the pump outlet conduits 22 either to the conduits 27, as shown in Fig. 3, or to the conduits 25, as shown in Fig. 9; and into the pump inlet conduits 21 either from the conduits 25, as shown in Fig. 3, or from the conduits 27, as shown in Fig. 9. In this manner the flow of the fluid which is always in the same direction at the pump may be reversed in circulating through the conduits 25 and 27 beyond the valves. The valve porting is also such that the valve rotors may be turned to merely circulate the fluid directly from the ports 20 back to the ports 19 without passing to the manifolds, as shown in Fig. 8. The two valves are mounted in fixed relation with the casing 1 on opposite sides, and are connected for simultaneous manual rotation by suitable means, such as radial arms and linkage 30, as shown in Fig. 1.

Ports 31 within the manifolds 26 establish communication between said manifolds and the various chambers 6 on opposite sides of the rotor plates 16, and in substantially opposed relation to each other. Similarly, ports 32 within the manifolds 28 establish communication between said manifolds and the chambers 6 on opposite sides of the rotor plates, and in opposed relation to each other. The pair of ports opening into each chamber on the same side of the corresponding rotor plate are arranged relative to the adjacent cams 18 so that fluid entering either through the ports 31 or 32 will effectively act on the vanes 17 and will rotate the plates 16 in one direction or the other before being forced out through the other port. At the points in the chambers 6 where the cams contact the plates 16, bleed bypasses 33 are provided in the casing about such points to avoid setting up an excessive pressure in the chambers due to the pressure of any fluid which has not been discharged. The ports 31 and 32 enter the chambers 6 substantially half way between the bypasses, and also between the high and low points of the cams. It will thus be seen that with rotation of the pump rotor, the fluid will be circulated from the pump, through the manifolds, and into the chamber 6; driving the motor plates 16 and the shaft 10, and will be returned to the pump. The plates 16 are driven in one direction or the other according to the setting of the valves 24, while the pump rotor is driven in a constant direction, as previously explained.

Figure 11:
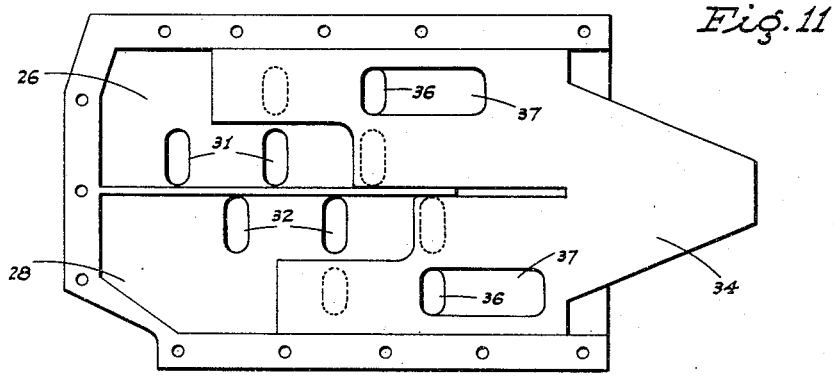
Figure 12:
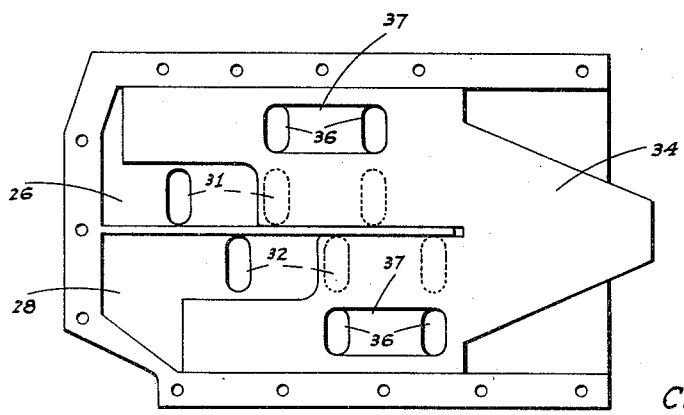

If the ports 31 and 32 are all open, fluid will be fed equally to all the chambers 6, exerting a powerful driving torque to shaft 10. If the speed of shaft 10 is not increased even with an increase in speed of the pump rotor (as when under a heavy load) said ports will remain open. As the speed of the shaft 10 increases, however, the ports 31 and 32 become successively and automatically closed by the following means:

Mounted in the manifolds in position to successively close said ports are slide valves 34 of plate form, controlled in their advancing and retracting movement by a governor mechanism 35 of suitable and conventional character, which is driven by the shaft 10 and arranged so that as the speed of said shaft increases, both slide plates 34 are advanced to a closing position to a greater extent the greater the speed of the shaft, as shown in Figs. 11 and 12.

When any pair of ports is closed, however, the fluid confined within the chambers 6 must be free to circulate to avoid pressure lock. To this end lateral ports 36 communicate with the various ports 31 and 32 and extend to the adjacent face of the slide valves 34 outside the manifolds, said ports 36 being normally closed by said valves. Said slide valve plates, however, are ported, as at 37, so that as they advance to close the ports 31 and 32, they successively open the ports 36. Communication is then established with the opposed manifolds by means of conduits 38, as shown in Fig. 4. In this manner any fluid circulated by the rotation of rotors 16 is freely circulated through and bypassed around the corresponding chambers 6.

From the foregoing description it will be readily seen that there has been produced such a device as substantially fulfills the objects of the invention, as set forth herein.

While this specification sets forth in detail the present and preferred construction of the invention, still in practice such deviations therefrom may be resorted to as do not form a departure from the spirit of the invention, as defined by the appended claims.

Having thus described the invention, the following is claimed as new and useful, and upon which Letters Patent are desired:

1. A hydraulic pump and transmission unit comprising a casing divided into a first chamber and a second chamber, each such chamber having an impeller therein of a form to divide the chamber into a first compartment and a second compartment separated axially of the casing, a driving shaft connected with the impeller in the first chamber and a driven shaft connected with the impeller in the second chamber, a pair of conduits connected with each compartment in opposed relation on opposite sides thereof, a valve ported for connection with the conduits connected with the first compartments in the first and second chamber, respectively, such valve being operable to selectively open a circuit leading in one direction through the first compartment of the second chamber and through the first compartment of the first chamber, or in a reverse direction through the said first compartment of the second chamber but in the same one direction through the first compartment of the first chamber, a second valve ported for connection with the conduits connected with the second compartments in the first and second chambers, respectively, and operable to selectively open a circuit leading in one direction through the second compartment of the second chamber and through the second compartment of the first chamber, or in a reverse direction through said second compartment of the second chamber but in the same one direction through the second compartment of the first chamber, and means for operating both of said valves in unison.

2. A structure as in claim 1 in which the valves are also operable to shut off the circuits through the first and second chambers and to open a circuit between both conduits of the respective compartments of the first chamber.

CLAUDE L. THOMAS.

REFERENCES CITED

The following references are of record in the file of this patent:

UNITED STATES PATENTS

| Number | Name | Date |
|---|---|---|
| 1,977,033 | Adams | Oct. 16, 1934 |
| 2,020,611 | Knapp | Nov. 12, 1935 |
| 2,337,499 | Roth | Dec. 21, 1943 |
| 2,374,588 | Doran | Apr. 24, 1945 |